United States Patent
Aspola et al.

(10) Patent No.: US 7,286,935 B2
(45) Date of Patent: Oct. 23, 2007

(54) METHOD AND DEVICE FOR HYDROMETEOR DETECTION

(75) Inventors: Juhani Aspola, Helsinki (FI); Jouni Ikonen, Helsinki (FI); Panu Kopsala, Tuusula (FI); Jaakko Korvenoja, Helsinki (FI); Atte Salmi, Porvoo (FI)

(73) Assignee: Vaisala Oyj, Helsinki (FI)

( * ) Notice: Subject to any disclaimer, the term of this patent is extended or adjusted under 35 U.S.C. 154(b) by 0 days.

(21) Appl. No.: 10/563,106

(22) PCT Filed: Jun. 16, 2004

(86) PCT No.: PCT/FI2004/000372

§ 371 (c)(1), (2), (4) Date: Dec. 30, 2005

(87) PCT Pub. No.: WO2005/003819

PCT Pub. Date: Jan. 13, 2005

(65) Prior Publication Data

US 2006/0241875 A1    Oct. 26, 2006

(30) Foreign Application Priority Data

Jul. 1, 2003 (FI) .................................. 20030992

(51) Int. Cl.
*G06F 19/00* (2006.01)
*G01W 1/00* (2006.01)

(52) U.S. Cl. ...................................... 702/3; 73/170.17

(58) Field of Classification Search ............... 702/3, 702/1, 50; 73/170.16–18, 170.21
See application file for complete search history.

(56) References Cited

U.S. PATENT DOCUMENTS

| | | | |
|---|---|---|---|
| 3,428,890 A * | 2/1969 | Atkins et al. | 324/666 |
| 4,245,499 A | 1/1981 | Nguyen et al. | |
| 4,520,667 A * | 6/1985 | Nelson | 73/170.21 |
| 4,698,748 A | 10/1987 | Juzswik et al. | |
| 4,747,041 A | 5/1988 | Engel et al. | |
| 4,780,843 A | 10/1988 | Tietjen | |
| 4,827,766 A * | 5/1989 | Nelson | 73/170.21 |
| 5,016,196 A | 5/1991 | Nelson et al. | |
| 5,125,268 A * | 6/1992 | Caron | 73/170.17 |
| 5,434,778 A * | 7/1995 | Nylander | 702/3 |
| 5,528,224 A * | 6/1996 | Wang | 340/583 |
| 6,634,225 B1 * | 10/2003 | Reime | 73/170.17 |
| 6,751,571 B1 * | 6/2004 | Hallett et al. | 73/170.17 |
| 7,050,949 B2 * | 5/2006 | Kokuryo et al. | 702/191 |
| 2005/0174720 A1 * | 8/2005 | Luukkala et al. | 361/600 |

FOREIGN PATENT DOCUMENTS

| | | |
|---|---|---|
| WO | WO-98/00736 A1 | 1/1998 |
| WO | WO-03/027719 A1 | 4/2003 |
| WO | WO-03/027720 A1 | 4/2003 |

* cited by examiner

*Primary Examiner*—Bryan Bui
*Assistant Examiner*—Toan M. Le
(74) *Attorney, Agent, or Firm*—Birch, Stewart, Kolasch & Birch, LLP

(57) ABSTRACT

This publication discloses a method and apparatus for measuring hydrometeors. According to the method, the mechanical impulses of hydrometers falling on a detection surface are measured. According to the invention, part of the measuring device (1) is used to perform a continuous measurement, in order to define a threshold value for an impulse and only after the threshold value is exceeded is the final part (2) of the measuring apparatus excited for measuring operations, in order to minimize the power consumption of the apparatus.

16 Claims, 2 Drawing Sheets

METHOD AND DEVICE FOR HYDROMETEOR DETECTION

CROSS-REFERENCE TO RELATED APPLICATION

The present application claims priority under 35 U.S.C. §119 to PCT Application No. FI 2004/000372, filed Jun. 16, 2004, the entire contents of which are hereby incorporated by reference.

BACKGROUND OF THE INVENTION

1. Field of the Invention

The present invention relates to a methodin connection with a measuring device detecting hydrometeors.

2. Description of Background Art

The invention also relates to an apparatus used in connection with a sensor detecting hydrometeors.

The method to which the invention relates concerns, sensors that measure precipitation is its various forms (especially water, snow, and hail), and which are based on detecting the mechanical impulses created when hydrometeors strike the detector surface. The method is suitable for both sensors, which measure the hydrometeors striking the detector surface directly, and sensors equipped with a funnel-like collector, which measure the water exiting as drops from the collector. The information provided by the sensor can be the amount of precipitation, the intensity of precipitation, the type of precipitation, the kinetic energy of the precipitation, or some other quantity that can be calculated from the impulses created by hydrometeors.

A sensor and method detecting hydrometeors that directly strike a detector surface are disclosed in, for example, a previous patent application by the applicant (Finnish application number 20011876). A precipitation sensor operating on a similar principle is also disclosed in EP publication 0 422 553 B1 and in German patent application DE 44 34 432 A1. A version equipped with a collector is disclosed in a previous application by the applicant (Finnish application number 20011875).

The sensors described in the above applications have certain drawbacks, which limit their use. The first relates to the power consumption of the sensors. Precipitation is typically measured in places, in which mains electricity is not readily available. Therefore, in the case of an electrical measuring device, dry-cell or accumulator batteries, or a battery-solar-cell combination are generally used as the power supply, so that, from the point of view of the apparatus's manufacturing and operating costs, power consumption should be substantially minimized. The sensors described in the above publications are formed from a sensing element and the related electronics, which amplifies the sensor signal and performs the signal processing necessary to generate the output signal. Through the sensing element as such can be passive, (for example, a piezoelectric element), the measuring electronics are switched on the whole time waiting for possible drops of precipitation and consuming power. Thus the solutions disclosed above are not optimal in terms of power consumption.

Another drawback of the known solutions is the disturbances caused by mechanical impacts and vibration due to other factors than hydrometeors striking the detector surface. Vibrations transmitted from the environment through the support structures of the sensor, or caused by the wind, if they are sufficiently strong, can cause triggering in the detection circuit, leading to a mechanical disturbance being registered spuriously as a hydrometeor.

SUMMARY AND OBJECTS OF THE INVENTION

The invention is intended to eliminate the defects of the state of the art disclosed above and for this purpose create an entirely new type of method and apparatus connection with a sensor detecting hydrometeors.

The invention is based on the device being excited for measurement operation for each individual hydrometeor. According to a second preferred embodiment of the invention, signals that do not relate to impacts of hydrometeors are filtered out of the measurement signals. Such signals are vibrations that travel through the structure and vibration phenomena caused by wind.

Considerable advantages are gained with the aid of the invention.

The power consumption of the measuring apparatus can be made very small, because the apparatus consumes power only for very short periods during the measurement. Thus possible auxiliary equipment, such as the electronic circuits relating to data communications, receive the maximum capacity form the available power supply.

The reduction of power consumption in the manner according to the invention also makes the apparatus more reliable, as the components accumulate fewer operating hours.

In turn, the spurious-signal filtering methods increase the measurement accuracy, because the number of spurious measurement events is reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the following, the invention is examined with the aid of examples and with reference to the accompanying drawings.

DETAILED DESCRIPTION OF THE PREFERRED EMBODIMENTS

Figure 1:
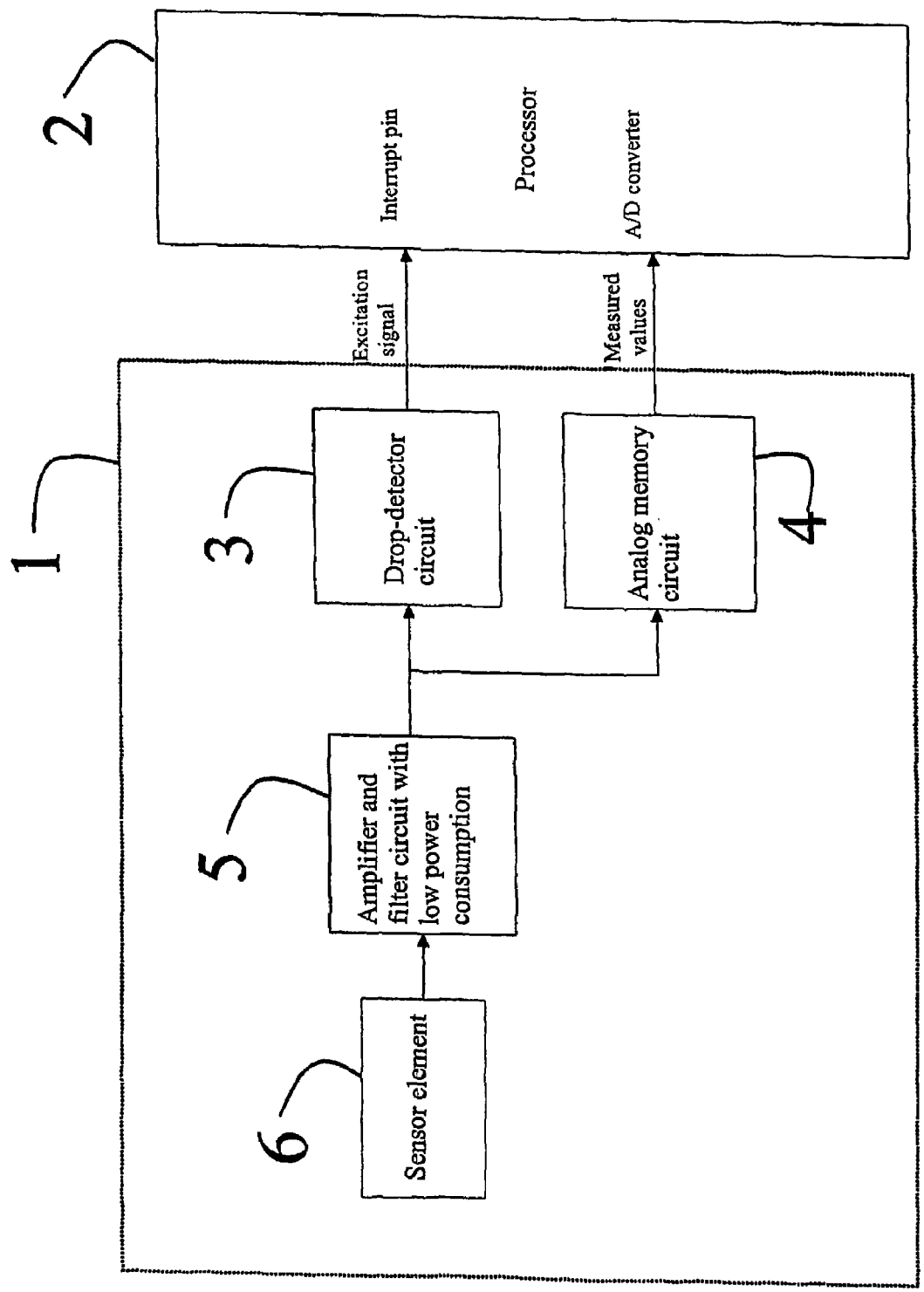
FIG. 1 shows a block diagram of one system according to the invention.

In the method according to the invention, the power consumption of the sensor is minimized by dividing the measuring electronics into two parts, according to FIG. 1:
- a detection circuit 1, which is switched on the whole time, and
- a processing circuit 2, which is normally kept switched off in a so-called power-saving mode, and which is excited for measurement only when necessary.

The detection circuit 1, which is designed to consume as little power as possible, is formed of the actual sensor 6, an amplifier and a filter which can be integrated in the same block 5, and a comparator 3. When a hydrometeor strikes the detector element 6, it creates a signal, which block 5 amplifies and possibly band-pass filters for the frequency range typical of the signal describing it and compares it with the threshold value of the comparator 3. The filtering can, of course, also be high or low-pass filtering, always according to the properties of the spurious signal. If the threshold value is exceeded, the circuit 3 generates an excitation signal for the processor circuit 2, which activates the circuit. The processing circuit 2 measures the detected hydrometeors, starting from the hydrometeor following the one that excited it. If new hydrometeors are not detected after a specific, predefined period of time (e.g., 10 s), the processing circuit returns to the power-saving state.

Power consumption can be further reduced by using a more highly developed method, in which the recording block 4 of the figure is connected in parallel with the comparator 3. The principle of the connection is that the processing circuit 2 is excited so quickly that it can measure already the signal cause by the exciting hydrometeor, either directly, or alternatively with the aid of the recording block 4. Once the signal recorded in the memory 4 has been measured and analysed, the processing circuit 2 returns immediately to the power-saving state.

Thus, the implementation can be based on an extremely rapidly excited processor 2, or, alternatively, on the detection circuit 1 recording the characteristic values of the exciting signal in the memory element 3, until the process is ready to read them. The characteristic value of the signal can be its maximum or minimum value, its half-band width, its rise time, frequency, or other feature, which is dependent on the type or size of the hydrometeor. Thus the memory circuit 4 should be able to record temporally a sufficiently long sequence of signals for the desired characteristic feature to be read afterwards.

Figure 2:
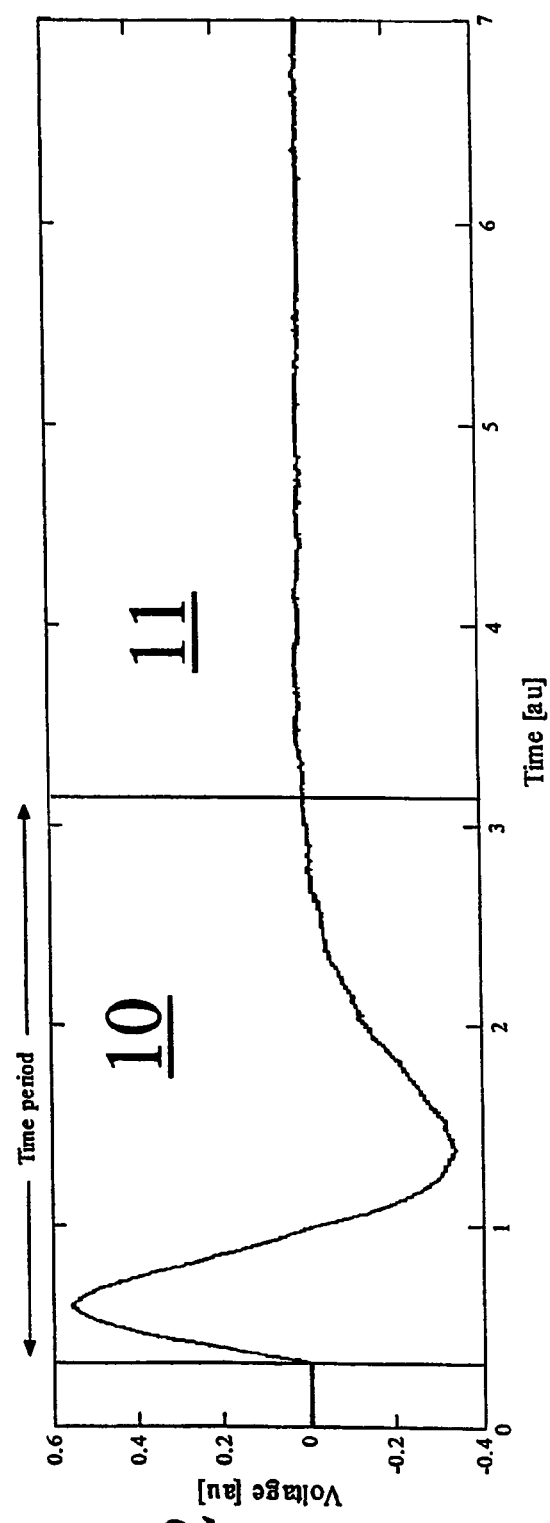
FIG. 2 shows graphically a signal created by a hydrometeor in the system according to the invention.
Figure 3:
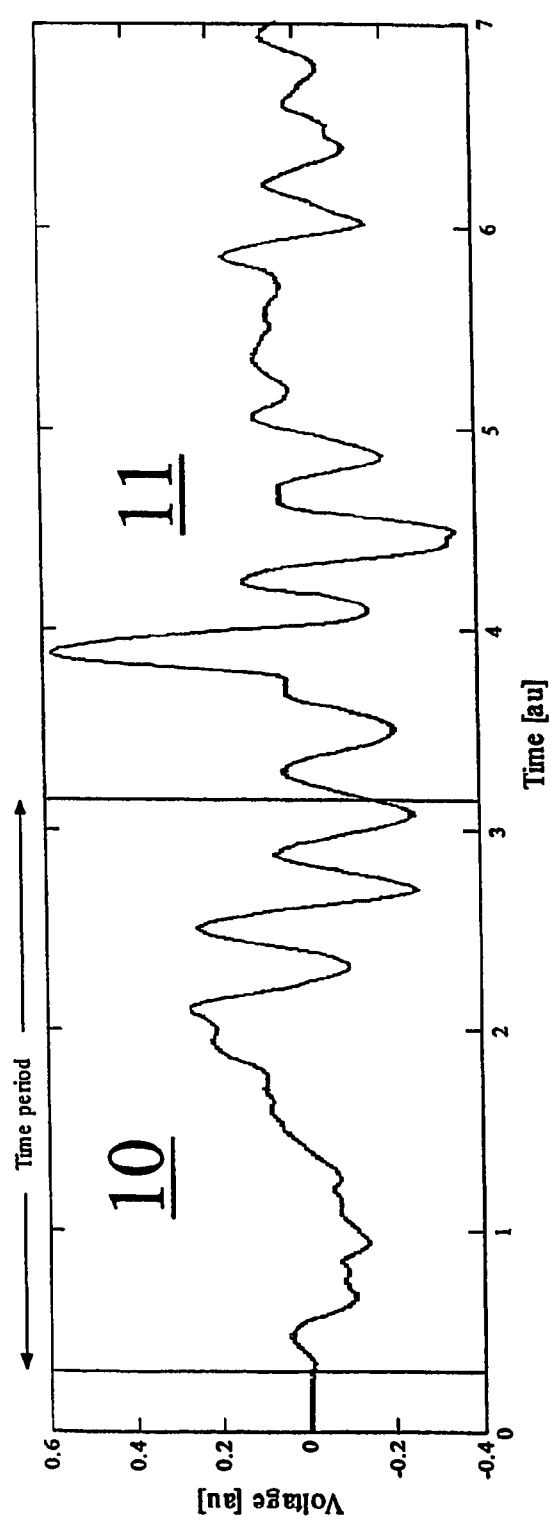
FIG. 3 shows graphically a spurious signal in the system according to the invention.

FIGS. 2 and 3, which show the response of the sensor to different types of excitation, illustrate the importance of filtering out spurious signals. FIG. 2 shows the signal created by a water drop while FIG. 3 shows the response created by a mechanical vibration transmitted through the support structure. If simple detection based on exceeding a threshold value is used, spurious signals like those shown in the lower figure will be registered as hydrometeors, resulting the sensor showing a reading that is too high when measuring, for example, the amount or intensity of precipitation.

The problem can be partly solved by using mechanical structures, such as springs or rubber pads, which attenuate the impacts and vibration transmitted from the external structures to the detection element. However, their use will not achieve complete attenuation, instead the strong signals will continue to be transmitted to the detection element and cause spurious registration. The use of mechanical attenuators will also not remove the disturbances caused by wind, which arise when an air current induces vibrations in the actual detector element.

In the method according to the invention, mechanical disturbances are filtered out of the signal during processing, on the basis of one or more characteristic features of a hydrometeor signal, with the aid of which a genuine hydrometeor signal can be distinguished from a spurious signal. Filtering takes place by a characteristic feature or features being defined from a pulse that exceeds the detection threshold, these being compared with preset criteria, and signals that do not meet the criteria being rejected. The characteristic feature used in the filtering can be the signal's frequency, maximum or minimum amplitude, rise or fall time, half-band width, some other feature depicting the pulse form, or some combination of these.

It should be noted that it is appropriate to use different characteristic features for different hydrometeors, such as water drops or hailstones, because the signals they cause differ considerably from each other. Thus, the filtering of disturbances can be preferably also combined with the identification of the form and types of precipitation.

A straightforward way to implement the disturbance-filtering method described above is to use a processor equipped with an analog-digital converter, by means of which, after triggering, a sample of the signal is registered in a digital form. The necessary parameters are calculated from the registered signal and the signal is classified accordingly. In that case however, a processor equipped with a high-speed A/D converter and with a relatively large memory and calculating power will be required, which will increase both the price and the power consumption of the apparatus. In the following, a method is disclosed, by means of which filtering can be implemented using a simpler and cheaper processor.

In the method, the a suitable parameter is first of all measured from the signal in connection with the triggering and again after a specified period of time. The characteristic feature used in the filtering is formed by comparing the parameter values measured at different times with each other. For example, the amplitude or the rate of change (time derivative) of the pulse can be selected as the parameter. In the case of FIG. 2, the characteristic feature can be formed by measuring the maximum amplitude after triggering (amax) in the time window 10 and after a moment of time dt (e.g., 3 ms) (adt) in the time window 11. Typically, the measured signal of a water drop decays rapidly. Spurious signals, on the other hand, typically decay in an oscillating manner and slowly. Thus the ratio amax/adt can be used as the characteristic feature and the acceptance criterion of the signal can be defined to be, for example, amax/adt>10.

Correspondingly, if the rate of change of the signal is selected as the parameter, the derivative of the signal is measured both after the triggering and after the period of time dt and the characteristic feature is formed from the ratio of these derivatives.

The selectivity of the method can be improved by using more than two measurement points. For example, the amplitude is measured after the triggering and after 2 ms and 3 ms and the ratios of theses amplitudes are compared with the set criteria.

An alternative method is to measure a specific signal parameter, starting from the moment of triggering, until it reaches a predefined value relative to the initial value, and to use the time this takes as the characteristic feature. In that case, for example, it is measured how low it takes for the amplitude of the signal to drop to a tenth of its maximum value.

In the case of disturbances caused by wind, the method disclosed above will not ensure error-free operation in all situations. The spurious signal created by wind in the detector element is typically continuous background noise, the intensity of which varies according to the velocity and gustiness of the wind. At high wind speeds, the spurious signal can then continuously exceed the triggering level, resulting in the capacity of the processing circuit being exceeded and most of the genuine hydrometeor signals remaining undetected.

Wind disturbance can be eliminated by setting the triggering level so high that even the disturbances caused by the highest winds do not exceed it. In that case, however, it will only be possible to detect large drops and the precision of measurement will suffer, especially in light rain, when most of the precipitation comes in the form of small drops.

In a more highly developed method according to the invention, an adaptive triggering level is used. In this case, the processor increases the triggering threshold as the wind velocity increases, so that the amplitude of the wind disturbances always remains beneath the triggering threshold. The wind velocity can be measured using either a separate wind sensor, or one integrated with the precipitation sensor. The best measurement precision will be achieved if a triggering threshold adjusted according to the wind is used together with the real-time correction of the wind error of the precipitation sensor disclosed in patent application FI 20011876.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method in connection with a measuring device detecting hydrometeors, method comprising the steps of:
   measuring mechanical impulses of the hydrometeors falling on a detection surface,
   defining a threshold value for the impulses by using an initial part of the measuring device (1) to perform a continuous measurement,
   only after the threshold value is exceeded, exciting a final part (2) of the measuring apparatus for measuring operations, in order to minimize power consumption of the apparatus,
   filtering out mechanical disturbances from a signal representing one of the impulses exceeding the threshold value during processing, on the basis of one or more characteristic features of the signal,
   defining a first parameter of the one impulse in a first time window (10) after defining the threshold value,
   defining the same parameter from the one impulse in a second, later time window (11),
   comparing the first and second time-window parameters with each other, in order to eliminate a spurious signal, and
   creating a ratio between first (10) and second (11) time windows to be used as a limit value for the spurious signal.

2. The method according to claim 1, further comprising to step of:
   returning the final part (2) of the measuring apparatus to an inactive state immediately after a measurement.

3. The method according to claim 2, further comprising the step of:
   recording pulse-specific measurement data (4) in the initial part (1) of the measuring apparatus, so that the final part can read it after the exciting step.

4. The method according to claim 1, further comprising the step of:
   recording pulse-specific measurement data (4) in the initial part (1) of the measuring apparatus, so that the final part can read it after the exciting step.

5. The method according to claim 1, wherein first parameter is an amplitude, a rate of change, a half-band width, or a frequency of the signal exceeding the threshold value.

6. A method for measuring hydrometeors, the method comprising the steps of:
   measuring mechanical impulses of the hydrometeors falling on a detection surface, and which exceed a predefined threshold value,
   defining a first parameter in a first time window (10) after the definition of the threshold value,
   in order to eliminate a spurious signal, defining the same parameter from the impulse in a second, later time window (11),
   comparing the first and second time-window parameters with each other, and
   creating a ratio between the first (10) and second (11) time windows to be used as a limit value for the spurious signal.

7. The method according to claim 6, wherein first parameter is an amplitude, a rate of change, a half-band width, or a frequency of the signal exceeding the threshold value.

8. A method for measuring hydrometeors, the method comprising the steps of:
   measuring mechanical impulses of the hydrometeors falling on a detection surface, and which exceed a predefined threshold value,
   triggering initiation of the measuring step when one of the impulses exceeds the threshold value,
   in connection with triggering, defining at least one initial parameter, from the impulse exceeding the threshold value,
   after the first measurement, measuring time which elapses before the parameter has reached a predefined value relative to the initial value of the parameter,
   using time which elapses as a characteristic parameter in filtering,
   defining a first parameter of the one impulse in a first time window (10) after defining the threshold value,
   defining the same parameter from the one impulse in a second, later time window (11),
   comparing the first and second time-window parameters with each other, in order to eliminate a spurious signal, and
   creating a ratio between the first (10) and second (11) time windows to be used as a limit value for the spurious signal.

9. The method according to claim 8, wherein first parameter is an amplitude, a rate of change, a half-band width, or a frequency of the signal exceeding the threshold value.

10. A method for measuring hydrometeors, the method comprising the steps of:
    measuring mechanical impulses of the hydrometeors falling on a detection surface, and which exceed a predefined threshold value,
    triggering initiation of the measuring step in connection with one of the impulses exceeding the threshold value exceeding the threshold value,
    in connection with triggering, defining at least one initial parameter, from the one impulse exceeding the threshold value, and
    adjusting the triggering level of a hydrometeor-signal detection circuit (3) on the basis of a wind velocity, in such a way that an amplitude of spurious signals caused by wind remains below the triggering level.

11. The method according to claim 10, wherein first parameter is an amplitude, a rate of change, a half-band width, or a frequency of the signal exceeding the threshold value.

12. A measuring device for detecting hydrometeors, comprising
  a detector part (1), including
    a detection element (6), for detecting impacts caused by the hydrometeors,
    an amplifier circuit (5), for amplifying an output signal of the detection element (6),
    a limit-value circuit (3), for triggering measurement of impulses exceeding a specific signal level, and
  a processor part (2) for processing a triggered signal representing one of impulses exceeding the specific signal level,
wherein
  the detector part (1) is arranged to perform continual measurement, in order to define a threshold value of the one impulse exceeding the specific signal level,
  the processor part (2) is arranged to be excited to measurement operations only when the threshold value is exceeded, in order to minimize power consumption of the measuring apparatus, and
  the device includes means for filtering out mechanical disturbances of the impulses exceeding the specific signal level during the processing, on the basis of one or more characteristic features of the one impulse exceeding the specific signal level,
  wherein the device is adapted
    to define a first parameter of the one impulse in a first time window (10) after defining the specific signal level,
    to define the same parameter from the one impulse in a second, later time window (11),
    to compare the first and second time-window parameters with each other, in order to eliminate a spurious signal, and
    to create a ratio between the first (10) and second (11) time windows to be used as a limit value for the spurious signal.

13. The device according to claim 12, wherein the processor part (2) of the measuring apparatus is arranged to return to an inactive state immediately after measurement.

14. The device according to claim 13, wherein the processor part (2) of the measuring apparatus is arranged to return to an inactive state immediately after measurement.

15. The device according to claim 12, wherein the detector part includes memory means (4) for recording pulse-specific measurement data, which the processor part can read after excitation.

16. The device according to claim 12, wherein first parameter is an amplitude, a rate of change, a half-band width, or a frequency of the signal exceeding the threshold value.

* * * * *